United States Patent [19]

Hirose

[11] Patent Number: 5,316,485

[45] Date of Patent: May 31, 1994

[54] LEARNING MACHINE

[75] Inventor: Atsushi Hirose, Sanda, Japan

[73] Assignee: Matsushita Electric Industrial Co., Ltd., Osaka, Japan

[21] Appl. No.: 9,636

[22] Filed: Jan. 27, 1993

[30] Foreign Application Priority Data

Feb. 3, 1992 [JP] Japan .................................. 4-017365

[51] Int. Cl.$^5$ ............................................. G09B 7/00
[52] U.S. Cl. ................................... 434/322; 434/118;
434/323; 434/362; 364/419.01; 395/800; 395/927
[58] Field of Search ............... 434/118, 169, 201, 322, 434/323, 307, 350, 362, 365; 364/419, 578; 395/400, 800, 927

[56] References Cited

U.S. PATENT DOCUMENTS

| 4,270,182 | 5/1981 | Asija | 364/419 |
|---|---|---|---|
| 4,689,737 | 8/1987 | Grant | 364/419 |
| 5,029,084 | 7/1991 | Morohasi et al. | 364/419 |
| 5,059,127 | 10/1991 | Lewis et al. | 434/322 X |
| 5,086,393 | 2/1992 | Kerr et al. | 434/118 X |
| 5,100,329 | 3/1992 | Deesen et al. | 434/362 X |
| 5,220,512 | 6/1993 | Watkins et al. | 364/578 X |
| 5,240,419 | 8/1993 | de Gyarfas | 434/322 |

Primary Examiner—Richard J. Apley
Assistant Examiner—Joe H. Cheng
Attorney, Agent, or Firm—Wenderoth, Lind & Ponack

[57] ABSTRACT

A learning machine including an information processing apparatus such as a personal computer, a work station, etc., the information processing apparatus comprising: a learning target gainer for gaining a learning target of a learner from the learner; a comprehension degree gainer for gaining from the learner a learning comprehension degree of the learner for each of learning items; a learning contents selector for selecting, on the basis of the learning target gainer and the comprehension degree gainer, learning contents including the learning items to be learned by the learner and the learning target for each of the learning items; and a learning material display which fetches, on the basis of the learning contents selected by the learning contents selector, a learning material so as to display the learning material to the learner.

5 Claims, 3 Drawing Sheets

Fig. 1 - PRIOR ART

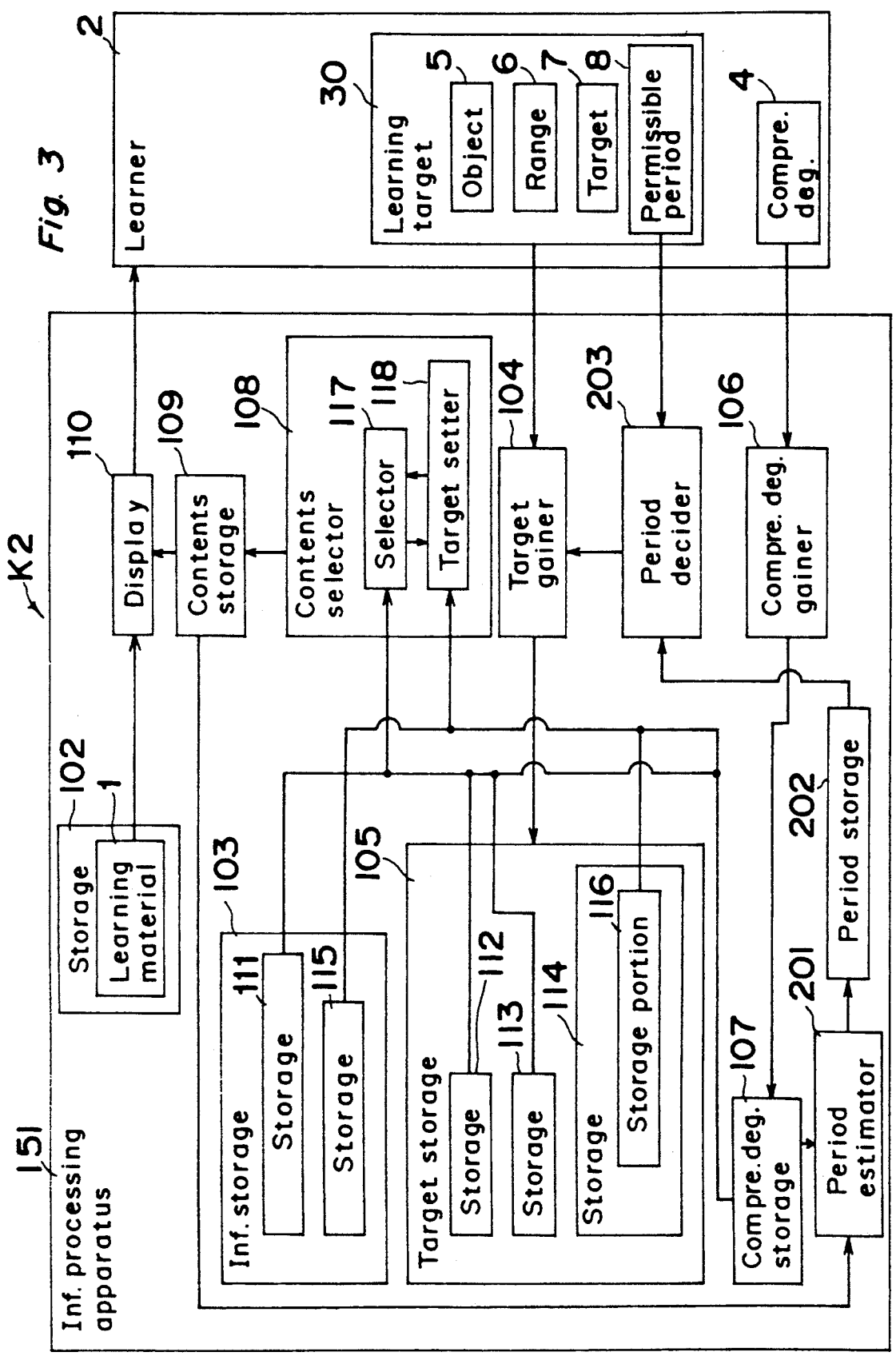

LEARNING MACHINE

BACKGROUND OF THE INVENTION

The present invention relates to an instruction and learning machine employing a computer (referred to as a "computer-aided instruction (CAI) machine", hereinbelow).

In response to recent rapid progress of computers and their related technologies, CAI machines employing personal computers, etc. are being put to practical use in education and training scenes of schools and corporations and thus, a number of learning materials are commercially available or prepared for themselves. On the other hand, in the course of progress of the known CAI machines to practical use, it has been widely recognized that the known CAI machines have such a drawback that CAI systems have the learning initiative. Thus, in order to materialize learning in which learners have the learning initiative, CAI systems based on hypermedia are attracting public attention.

One example of learning materials used in conventional CAI machines based on hypermedia is described with reference to FIG. 1. In FIG. 1, the known learning material includes a plurality of information units called "nodes" 301. The nodes 301 include various data such as sentences, graphic forms, still images, etc. The nodes 301 are connected with each other by links 302 such that a learning material for CAI is formed as a whole. This is described in, for example, a magazine entitled "Bit", Vol. 22, No. 8 (August, 1990), pages 35–42 and published by Kyoritsu Shuppan Co., Ltd. of Japan.

The known CAI machine of the above described arrangement is operated as follows. By tracing the links 302 with a mouse or the like, a learner sequentially attains access to the various data contained in the nodes 301 prepared as the learning material so as to perform learning.

However, in the above described arrangement of the known CAI machine, since the learning initiative is completely given to the leaner, learners who have no sufficient knowledge enabling learning through search cannot perform learning efficiently. Nevertheless, if a CAI system is arranged to simply guide the learner, such a problem arises that learning in which the learner has the learning initiative cannot be materialized.

SUMMARY OF THE INVENTION

Accordingly, an essential object of the present invention is to provide, with a view to eliminating the above described inconveniences inherent in conventional CAI machines, a CAI machine which is capable of guiding a learner for learning through search while giving the learning initiative to the learner.

In order to accomplish this object of the present invention, a learning machine according to the present invention includes an information processing apparatus such as a personal computer, a work station, etc., said information processing apparatus comprising: a learning material storage for storing a learning material for each of learning items; a learning item information storage for storing information on contents of the learning material; a learning target gainer for gaining a learning target of a learner from the learner; a learning target storage for storing the learning target gained from the learner by said learning target gainer; a comprehension degree gainer for gaining from the learner a learning comprehension degree of the learner for each of the learning items; a comprehension degree storage for storing the learning comprehension degree gained from the learner by said comprehension degree gainer; a learning contents selector for selecting, on the basis of contents stored in said learning item information storage, said learning target storage and said comprehension degree storage, learning contents including the learning items to be learned by the learner and the learning target for each of the learning items; a learning contents storage for storing the learning contents selected by said learning contents selector; and a learning material display which sequentially fetches, on the basis of the learning contents stored in said learning contents storage, the learning material from said learning material storage so as to display the learning material to the learner.

By this arrangement of the present invention, the learning contents selector determines, on the basis of the learning target of the learner stored in the learning target storage and the learning comprehension degree of the learner stored in the comprehension degree storage, the learning contents including the learning items to be learned by the learner and the learning target for each of the learning items and stores the learning contents in the learning contents storage such that the learning material display sequentially displays the learning material to the learner on the basis of the learning contents stored in the learning contents storage.

In the present invention, the learner can receive display of the learning material based on the learning items and the comprehension target selected in accordance with the learning target and the learning comprehension degree of the learner himself. Therefore, without meeting any obstacle in learning through search in which the learner has the learning initiative, the learner can be guided for raising efficiency of search in learning through search.

BRIEF DESCRIPTION OF THE DRAWINGS

This object and features of the present invention will become apparent from the following description taken in conjunction with the preferred embodiments thereof with reference to the accompanying drawings, in which:

FIG. 3 is a block diagram showing a learning machine according to a second embodiment of the present invention.

Before the description of the present invention proceeds, it is to be noted that like parts are designated by like reference numerals throughout several views of the accompanying drawings.

DETAILED DESCRIPTION OF THE INVENTION

Figure 1:
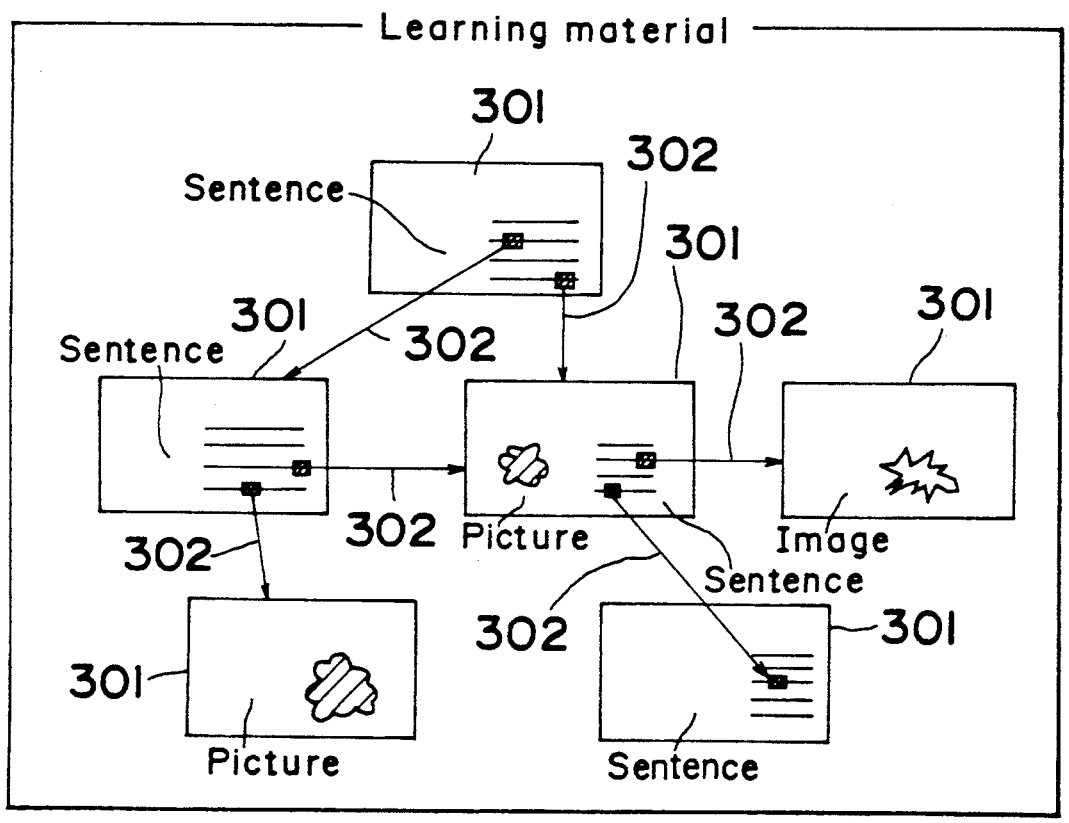
FIG. 1 is a diagram showing a configuration of a prior art CAI machine based on hypermedia (already referred to)
Figure 2:
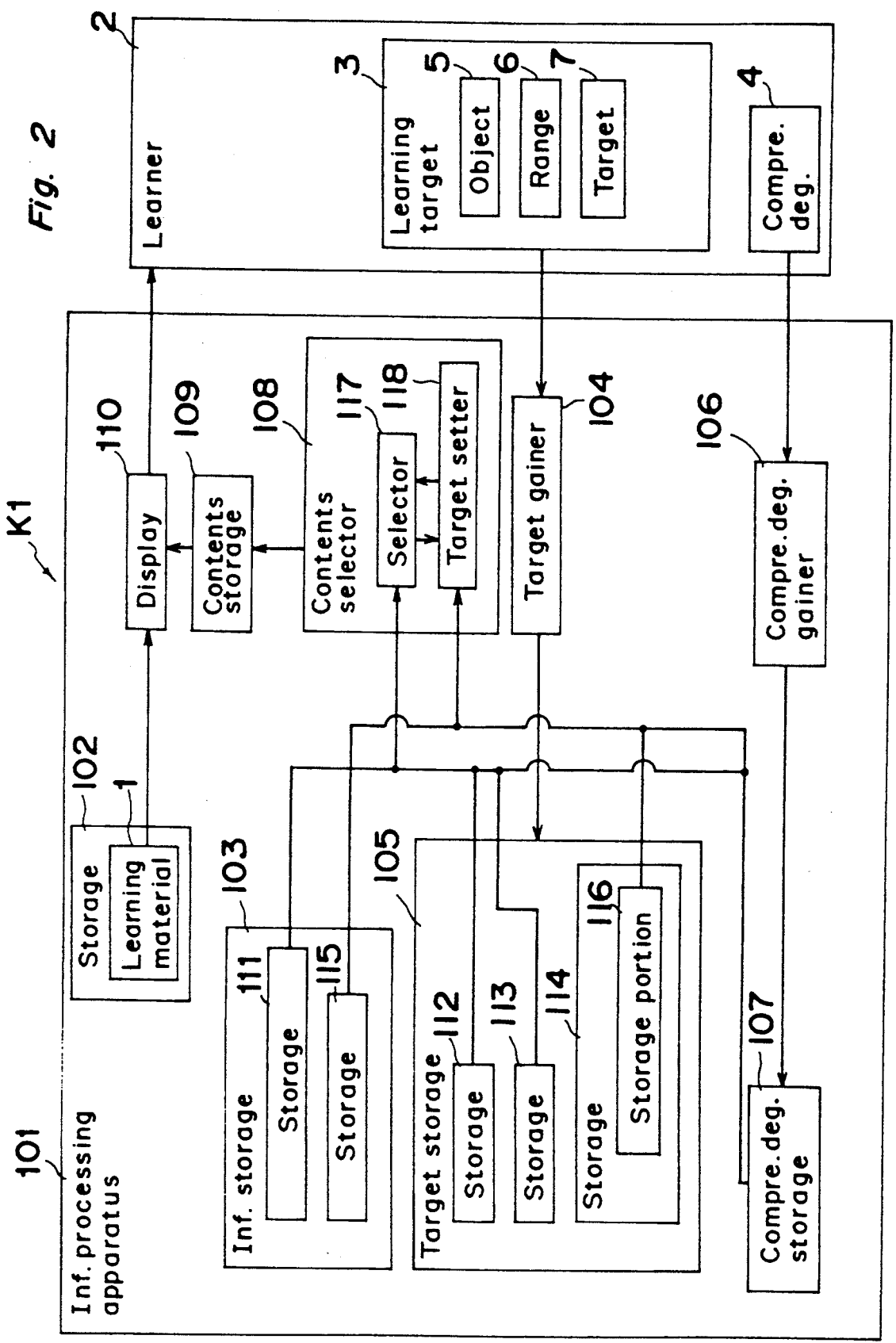
FIG. 2 is a block diagram showing a learning machine according to a first embodiment of the present invention.

Referring now to the drawings, there is shown in FIG. 2, a learning machine K1 according to a first embodiment of the present invention. A learner 2 has a learning target 3 and a learning comprehension degree 4. The learning target 3 includes a learning object 5, a learning range 6 and a comprehension target 7.

The learning machine K1 includes an information processing apparatus 101 such as a personal computer, a work station, etc. for processing, storing and outputting various data. The apparatus 101 includes a learning material storage 102 for storing a learning material 1 for each of learning items, a learning item information storage 103 for storing information on contents of the learning material 1 and a learning target gainer 104 for gaining the learning target 3 of the learner 2 from the learner 2.

The apparatus 101 further includes a learning target storage 105 for storing the learning target 3 gained from the learner 2 by the learning target gainer 104, a comprehension degree gainer 106 for gaining from the learner 2 the learning comprehension degree 4 of the learner 2 for each of the learning items, a comprehension degree storage 107 for storing the learning comprehension degree 4 gained from the learner 2 by the comprehension degree gainer 106 and a learning contents selector 108 for selecting, on the basis of contents stored in the learning item information storage 103, the learning target storage 105 and the comprehension degree storage 107, learning contents including the learning items to be learned by the learner 2 and the learning target 3 for each of the learning items.

Furthermore, the apparatus 101 includes a learning contents storage 109 for storing the learning contents selected by the learning contents selector 108 and a learning material display 110 which sequentially fetches, on the basis of the learning contents stored in the learning contents storage 109, the learning material 1 stored in the learning material storage 102 so as to display the learning material 1 to the learner 2.

The learning item information storage 103 includes an importance degree storage 111 for storing an importance degree of each of the learning items for one or more learning objects 5 and a learning material type storage 115 for storing types of the learning material 1 f or each of the learning items.

Meanwhile, the learning target storage 105 includes a learning object storage 112 for storing the learning object 5 of the learner 2, a learning range storage 113 for storing, in the form of a threshold value of the importance degree of each of the learning items, the learning range 6 which the learner 2 wishes to learn and a comprehension target storage 114 for storing the comprehension target 7 of the learner 2. The comprehension target storage 114 further includes a storage portion 116 for storing the comprehension target 7 for each of the types of the learning material 1.

Furthermore, the learning contents selector 108 includes a learning item selector 117 for selecting, on the basis of contents stored in the learning object storage 112, the learning range storage 113, the importance degree storage 111 and the comprehension degree storage 107, the learning items to be learned by the learner 2 and a comprehension target setter 118 for setting, on the basis of contents stored in the learning material type storage 115 and the storage portion 116, the comprehension target 7 for each of the learning items selected by the learning item selector 117.

Operation of the learning machine K1 of the above described arrangement is described with reference to FIG. 2, hereinbelow. Initially, the learning target gainer 104 gains the learning target 3 of the learner 2 such as the learning object 5, the learning range 6 and the comprehension target 7 from the learner 2 and stores the learning object 5, the learning range 6 and the comprehension target 7 in the learning object storage 112, the learning range storage 113 and the comprehension target storage 114 of the learning target storage 105, respectively. The comprehension target 107 for each of the types of the learning material 1 is stored in the storage portion 116 of the comprehension target storage 114.

Meanwhile, the comprehension degree gainer 106 gains the learning comprehension degree 4 of the learner 2 from the learner 2 and stores the learning comprehension degree 4 in the comprehension degree storage 107.

Then, based on contents stored in the importance degree storage 111 of the learning item information storage 103 and the learning object storage 112 and the learning range storage 113 of the learning target storage 105, the learning item selector 117 selects the learning items to be learned by the learner 2. At this time, by referring also to contents stored in the comprehension degree storage 107, the learning item selector 117 deletes learning items which are considered to have been fully comprehended by the learner 2.

Subsequently, based on contents stored in the learning material type storage 115 and the storage portion 116, the comprehension target setter 118 sets the comprehension target 7 for each of the learning items selected by the learning item selector 117. At this time, by referring also to contents stored in the comprehension degree storage 107, the comprehension target setter 118 is adapted to prevent the learning item selector 117 from selecting learning items whose learning comprehension degree 4 of the learner 2 is considered to have exceeded the comprehension target 7 set by the comprehension target setter 118.

Thereafter, the learning contents storage 109 stores the learning contents selected by the learning contents selector 108 as described above and the learning material display 110 sequentially fetches, on the basis of the learning contents stored in the learning contents storage 109, the learning material 1 stored in the learning material storage 102 so as to display the learning material 1 to the learner 2.

As described above, the learner can receive display of the learning material based on the learning items and the comprehension target which are selected in accordance with the learning object and the learning comprehension degree of the learner himself in the first embodiment of the present invention. Accordingly, in accordance with the first embodiment of the present invention, without meeting any obstacle in learning through search in which the learner has the learning initiative, the learner can be guided for raising efficiency of search in learning through search.

FIG. 3 shows a learning machine K2 according to a second embodiment of the present invention. In the learner 2, the learning target 3 in the learning machine K1 is replaced by a learning target 30. In addition to the learning object 5, the learning range 6 and the comprehension target 7 of the learning target 3, the learning target 30 includes a permissible period 8 allotted to learning by the learner 2 The learning machine K2 includes an information processing apparatus 151. In addition to the constituent elements 102 to 118 of the apparatus 101, the apparatus 151 includes a period estimator 201 for performing, on the basis of the learning items to be learned by the learner 2 and the comprehension target 3 for each of the learning items stored in the learning contents storage 109 and the learning comprehension degree 4 of the learner 2 stored in the comprehension degree storage 107, predictive calculation of a period required for learning of the learner 2, an estimated period storage 202 for storing the period estimated by the period estimator 201 and a period decider 203 for deciding whether or not the estimated period stored in the estimated period storage 202 is less than the permissible period 8. In case the period decider 203 has decided that the estimated period stored in the estimated period storage 202 is larger than the permissible period 8, the period decider 203 causes the learning target gainer 104 to demand that the learner 2 should reconsider the learning target 30.

Since other constructions of the apparatus 151 are similar to those of the apparatus 101, description thereof is abbreviated for the sake of brevity.

In the learning machine K2 of the above described arrangement, the period estimator 201 estimates, on the basis of contents stored in the learning contents storage 109 and the comprehension degree storage 107, the period required for learning of the learner 2 and stores the estimated period in the estimated period storage 202. Then, the period decider 203 compares the estimated period stored in the estimated period storage 202 with the permissible period 8, one of the items of the learning target 30. In case the period decider 203 has decided that the estimated period stored in the estimated period storage 202 exceeds the permissible period 8, the period decider 203 acts on the learning target gainer 104 so as to cause the learner 2 to recheck the learning target 30. Since other operations of the learning machine K2 are the same as those of the learning machine K1, description thereof is abbreviated for the sake of brevity.

As described above, in the second embodiment of the present invention, the learning machine K2 includes the period estimator 201 for estimating the period required for learning and the period decider 203 for comparing the estimated period with the permissible period 8 of the learner 2. When the period decider 203 has decided that the estimated period exceeds the permissible period 8, the period decider 203 causes the learner 2 to recheck the learning target 30.

Therefore, in accordance with the second embodiment of the present invention, the permissible period 8 which is usually difficult to determine can be included in the learning target 3 at the time of selection of the learning items to be learned by the learner 2 and the comprehension target 7 for each of the learning items. As a result, the learner 2 can obtain the learning material 1 based on the learning items and the comprehension target for each of the learning items, which correspond to actual situations more closely.

Meanwhile, in the first and second embodiments of the present invention, the information processing apparatus is not limited to general purpose computers such as a work station, a personal computer, etc. but may also be replaced by any apparatus having an information processing function.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A computerized learning machine including an information processing apparatus, said information processing apparatus comprising:
   a learning material storage for storing a learning material for each of learning items;
   a learning item information storage for storing information on contents of the learning material;
   a learning target gainer for gaining a learning target of a learner from the learner;
   a learning target storage for storing the learning target gained from the learner by said learning target gainer;
   a comprehension degree gainer for gaining from the learner a learning comprehension degree of the learner for each of the learning items;
   a comprehension degree storage for storing the learning comprehension degree gained from the learner by said comprehension degree gainer;
   a learning contents selector for selecting, on the basis of contents stored in said learning item information storage, said learning target storage and said comprehension degree storage, learning contents including the learning items to be learned by the learner and the learning target for each of the learning items;
   a learning contents storage for storing the learning contents selected by said learning contents selector; and
   a learning material display which sequentially fetches, on the basis of the learning contents stored in said learning contents storage, the learning material from said learning material storage so as to display the learning material to the learner.

2. A learning machine as claimed in claim 1, wherein said learning item information storage includes an importance degree storage for storing an importance degree of each of the learning items for at least one learning object, while said learning target storage includes a learning object storage for storing the learning object of the learner, a learning range storage for storing, in the form of a threshold value of the importance degree of each of the learning items, a learning range the learner wishes to cover and a comprehension target storage for storing a comprehension target of the learner,
   said learning contents selector including a learning item selector for selecting, on the basis of contents stored in said importance degree storage, said learning object storage, said learning range storage and said comprehension degree storage, the learning items to be learned by the learner and a comprehension target setter for setting, on the basis of contents stored in said comprehension target storage, the comprehension target for each of the learning items selected by said learning item selector.

3. A learning machine as claimed in claim 2, wherein said learning item information storage further includes a learning material type storage for storing types of the learning material for each of the learning items, while said comprehension target storage further includes a storage portion for storing the comprehension target for each of the types of the learning material such that said comprehension target setter sets, on the basis of contents stored in said learning material type storage and said storage portion, the comprehension target for each of the learning items selected by said learning item selector.

4. A learning machine as claimed, in claim 2, wherein said information processing apparatus further comprises:
- a period estimator for performing, with reference to the learning items to be learned by the learner and the comprehension target for each of the learning items stored in said learning contents storage as well as the learning comprehension degree of the learner stored in said comprehension degree storage, predictive calculation of a period required for learning of the learner;
- an estimated period storage for storing the period estimated by said period estimator; and
- a period decider for deciding whether or not the estimated period stored in said estimated period storage is less than a permissible period allotted to learning by the learner;
- wherein in case said period decider has decided that the estimated period exceeds the permissible period, said period decider causes said learning target gainer to demand that the learner should reconsider the learning target.

5. A learning machine as claimed in claim 3, wherein said information processing apparatus further comprises:
- a period estimator for performing, with reference to the learning items to be learned by the learner and the comprehension target for each of the learning items stored in said learning contents storage as well as the learning comprehension degree of the learner stored in said comprehension degree storage, predictive calculation of a period required for learning of the learner;
- an estimated period storage for storing the period estimated by said period estimator; and
- a period decider for deciding whether or not the estimated period stored in said estimated period storage is less than a permissible period allotted to learning by the learner;
- wherein in case said period decider has decided that the estimated period exceeds the permissible period, said period decider causes said learning target gainer to demand that the learner should reconsider the learning target.

* * * * *